United States Patent [19]

Kersey et al.

[11] Patent Number: 5,332,562
[45] Date of Patent: Jul. 26, 1994

[54] METHOD FOR REMOVING PARTICULATE MATTER AND GASES FROM A POLLUTED GAS STREAM

[76] Inventors: Larry M. Kersey, 8501 E. Camino Vivaz, Scottsdale, Ariz. 85255; Richard A. Steinke, 2164 Three Kings Ct., Park City, Utah 84060

[21] Appl. No.: 77,740

[22] Filed: Jun. 18, 1993

[51] Int. Cl.$^5$ ............................................. B01J 8/08
[52] U.S. Cl. .................................. 423/210; 422/171; 422/177; 422/213; 95/57; 95/62; 95/61; 95/70; 95/277; 95/287; 96/27; 55/317
[58] Field of Search ................. 423/243.06, 244.01, 423/244.07, DIG. 16, 210; 96/27, 55; 95/57, 58, 62, 68, 61, 70, 277, 287; 422/171, 177, 213; 55/317

[56] References Cited

U.S. PATENT DOCUMENTS

| | | | |
|---|---|---|---|
| 4,220,478 | 9/1980 | Schuff | 106/281 R |
| 4,290,786 | 9/1981 | Schuff | 55/107 |
| 5,167,931 | 12/1992 | Downs | 422/142 |

FOREIGN PATENT DOCUMENTS

| | | | |
|---|---|---|---|
| 0005270 | 11/1979 | European Pat. Off. | 423/243.06 |
| 2533690 | 2/1976 | Fed. Rep. of Germany | 96/27 |
| 3828839 | 7/1989 | Fed. Rep. of Germany | 423/244.07 |
| 58-122024 | 7/1983 | Japan | 423/243.06 |

*Primary Examiner*—Gary P. Straub
*Assistant Examiner*—Timothy C. Vanoy
*Attorney, Agent, or Firm*—M. Reid Russell

[57] ABSTRACT

The steps of the method of the invention are preferably practice on apparatus consisting of components arranged in a closed system for removing particulate matter and gases from a polluted gas stream that includes a sorbent particulate charging and injection gun for electrostatically charging sorbent particles and injecting them into a polluted gas stream to charge and agglomerize pollution particulates therein, the stream flowing into a collection system housing that contains a series of moving and static bed filters and provides for operations at pressures less than atmospheric, and at temperatures up to two thousand (2000) degrees F. The filter beds are maintained across the housing and spaced apart from front to back therein, each filter containing a media material selected for removing the charged agglomerized pollution and sorbent reacted particulates and reacting with gases in the polluted gas stream, providing for removal thereof to clean that gas stream that is then vented to atmosphere. At least one and preferably a plurality of moving bed filters are arranged in the collection system housing, each, in turn, receiving and passing the gas stream therethrough, which filter beds each including rotary airlock and rotary valves for maintaining a closed system and preventing infiltration of outside air within the housing while still allowing new media materials to be added and vented out of the filter, and a static bed filter is used as a final clean up filter.

14 Claims, 6 Drawing Sheets

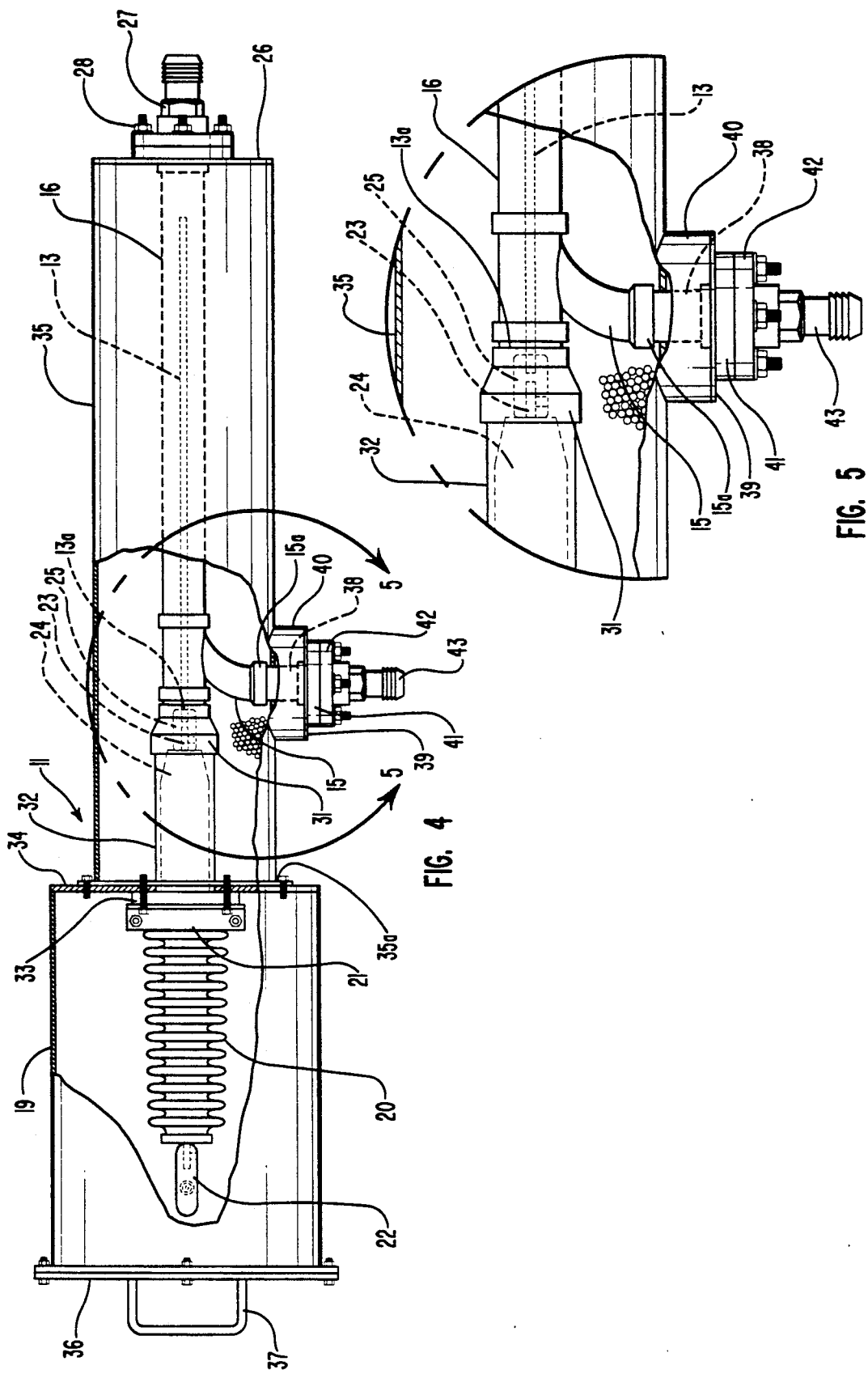

METHOD FOR REMOVING PARTICULATE MATTER AND GASES FROM A POLLUTED GAS STREAM

BACKGROUND OF THE INVENTION

1. Field of the Invention

This invention relates generally to methods for removing particulate matter and gases from a polluted gas stream, and more particularly to methods involving adding of electrostatically charged sorbent particles to a polluted gas stream containing particulate matter that becomes charged and adheres to the sorbent particles that are then removed, along with the sorbent reacted gaseous pollutants, in a series of moving beds of granular material with the removed materials recovered for use or disposal and the cleaned gas vented.

2. Prior Art

Only in recent years have air pollution control apparatus and methods been developed for the efficient and effective removal of fine particulate matter, particularly submicron particles produced in high volume processes. Earlier particulate removal methods and systems experienced substantial difficulties when they were required to meet strict requirements and regulations as have been imposed by governmental agencies for the removal of such particulate matter. Also, the removal of noxious gases has often present problems of a generation of non-disposable wastes as were produced in earlier industrial gas cleaning methods and systems.

Only recently have systems been implemented that overcome some of the above set out difficulties. Specifically, U.S. Patents to Schuff, U.S. Pat. Nos. 4,220,478 and 4,290,786, are directed, respectively, to a method and to an apparatus, for removing particulate matter from a gas stream that, like the present invention, involve injecting electrostatically charged particles of a sorbent material into a gas stream to form a large charged surface area to induce charging the particulate matter entrained in the gas stream. The charged particles contained in the gas stream together with the injected particles are passed through a porous moving bed of media of granular materials, wherein, as a result of the electrical charge on the particles and the inertial impact forces of the respective particles, the particles attach to the changing media. The media, together with attached sorbent additive and particulate matter are then separated for use in a product manufactured from which generated particulate matter or are disposed of, with the cleaned gas leaving the moving media for venting.

Like the earlier Schuff patents, the method of the present invention preferably utilizes an electrostatic charging gun for imparting a strong electrostatic charge onto sorbent particles introduced into the polluted gas stream. The sorbent particles all bear the same charge and thereby repel one another and are accordingly rapidly dispersed through the gas stream, creating a large charged surface area inducing charging of the particulate matter within that gas stream. This charged surface tends to agglomerate the submicron and larger particulates with the gaseous pollutants chemically reacted with the charged sorbent particles and with the media bed materials. The gas flow containing agglomerated particulates and sorbent particles with captured pollutants is then passed to moving media bed arrangements for the filtration and collection of the sorbent reaction product and particulates and gases from the gas stream, cleaning the gas stream that is then vented to atmosphere. The Schuff apparatus and method for its use, however, present limited capacity for particulate removal from high volume polluted gas flows. The present invention overcomes these deficiencies by including a practice of steps of the invention where the sorbent flow can be controlled and the electrostatic charging of the sorbent particles can be adjusted, and provides multiple moving beds of the same or different media material, each to present a large surface area of exposure to the gas flow containing sorbent reaction products and particulates, with the inclusion of a static bed for complete pollutant removal. Additionally, unique from the Schuff patents, the present invention the moving beds are contained within a housing that includes an airlock system that has a capability for maintaining the beds at a pressure less than atmospheric without the infusion of outside air, providing for a more efficient contaminant removal with the preferred system wherein the method of the invention is practiced being capable of operating at temperatures up to two thousand (2000) degrees F.

SUMMARY OF THE INVENTION

It is a principal object of the present invention to provide a method for removing both submicron and larger pollutant particulates and gaseous pollutants from high to low volume gas streams and for venting a pollutant free gas flow to atmosphere.

Another object of the present invention is to provide a method for the removal of both submicron and larger particulates of pollutants and gaseous pollutants from a polluted gas stream that is adjustable to a wide range of pollutant volumes as are contained in a gas stream that functions at less than atmospheric pressure.

Another object of the present invention is to provide a method for the removal of pollutant particulates and gaseous pollutants from a gas stream that takes place at temperatures of up to two thousand (2000) degrees F.

Another object of the present invention is to provide a method for the removal of pollutant particulates and gases from a gas stream that utilizes a system for providing an injection of electrostatically charged sorbent particles into the gas stream, the particles to repel each other and are rapidly dispersed throughout the polluted stream, which injection of charged sorbent particles is variable to accommodate a particular gas stream that contains from high to low volumes of pollutants.

Still another object of the present invention is to provide a method for the removal of pollutant particles of submicron and larger and gaseous pollutants from a polluted gas stream that utilizes a system for providing an infusion of electrostatically charged sorbent to agglomerate the pollutant particles and then provides for separating the agglomerated particles and gaseous pollutants from the stream by serial passage of the stream through a plurality of moving beds of media material as are suitable, and may be the same or different materials, to provide for that agglomerized particulate and sorbent reacted particulates removal and with a passage through a static filter bed to finally remove essentially all the pollutant materials from the gas stream that is then vented to atmosphere.

Still another object of the present invention is to provide a method that involves agglomerizing and the removal of pollutant particulates and gaseous pollutants from a gas stream that then provides for refining out those removed agglomerized particulates from a moving bed media material containing those captured particulates for processing for use or disposal.

Still another object of the present invention is to provide a method whose practice provides for removing essentially all pollutants from a variety of gas streams that is practiced in a system that operates over a wide range of temperatures and at a pressure below atmospheric that is safe and reliable to use and is relatively inexpensive to maintain as, with operations at high temperature, corrosive gases and/or liquids are not to created that could damage the equipment.

Still another object of the present invention is to provide a method that is practiced in a simple robust system that has relatively low power requirements, utilizes inexpensive material for moving media bed filters of the system and sorbent materials as are used in the system, and is easy to operate.

These and other objectives of the method of the present invention will become apparent to those knowledgeable and skilled in the art with the description set out below.

A practice of the method of the invention provides for a removal of a broad range of pollutants as are encountered in a gas stream generated by an industrial operation. Federal Environmental Agencies require a reduction of such pollutant presence in a gas stream in compliance with county, state, and federal guidelines, requiring an effective removal of all of such pollutants, including: particulates, condensible solids, acid mist (including sulphur trioxide—$SO_3$, sulfuric acid—$H_2SO_4$, hydrochloric acid—HCL), sulphur dioxide ($SO_2$), halogen gas, and VOC's.

Briefly, and in accordance with one embodiment of a preferred system for practicing the method of the present invention, the modular apparatus of the system provides modular components arranged together for injecting electrostatically charged sorbent particles into a polluted gas stream from one or more charged dry sorbent injection guns. Each such gun provides a high voltage corona discharge that a flow of sorbent particles is passed therethrough, the sorbent individual particles to receive a strong electrostatic charge. The charged sorbent particles are then injected into the polluted gas stream.

The preferred injection gun of the invention is arranged to provide a variable corona discharge to accommodate different flows of sorbent materials as have been selected for a particular gas stream pollution condition. The invention further provides, as required, for the inclusion of multiple injection guns, each to receive a select volume of sorbent flow for providing a required sorbent particle presence in the gas stream, which presence is engineered to be sufficient to react with all the pollutants in that gas stream.

The charged sorbent particles are passed under pressure into the injection gun and are preferably fine grain particles that all bear the same charge, that like charge condition tending to rapidly disperse the particles in the gas stream. The charged sorbent particles thereby provide a large charged surface area for inducing like charges onto the particulate matter entrained within the incoming gas stream. The gas stream particulate matter, consisting of submicron and larger particles, and the sorbent particles, thereby all carry the same charge and are passed together into a transition section of a collection chamber housing that includes a diffusion cone. The transition section has a much greater area than that of the line transporting the gas stream, causing a rapid decrease in gas flow velocity with the diffusion cone directing the gas stream over the surface of a first moving filter bed. This change in velocity causes some of the heavier particles in the gas stream to precipitate out of that flow, falling in front of the first of a plurality of vertical filters that are each moving beds containing a granular media.

Each granular media moving bed is maintained across the gas stream flow path, and is contained to move downwardly between spaced apart punch plates, that are sections of a mesh material, or like plates, that are open therethrough to freely pass the gas stream. Front and rear punch plates of each bed are preferably spaced approximately twelve (12) inches apart, and contain granular materials that are selected to be suitable for reacting with the charged pollutant and sorbent particles, agglomerizing therewith into large particles, that are removed be screening, or like method, the sorbent particles to also react with the gas stream gaseous pollutants. The agglomerated particles are screened from the granular media and are then passed for processing the pollutant materials therefrom for use or disposal. Whereafter, the now clean granular media is recycled for passage again through a moving bed filter.

Each bed of granular media materials is a gravity flow bed, the granular media materials passing into the bed from a hopper that is fed through a valve with the media and captured pollutant and sorbent particles let down and passed out at the bottom of the bed by a rotary airlock valve. In practice, a plurality of beds of moving granular media materials are utilized, generally from three to five depending upon the pollutant make-up and volume in the gas stream, each bed functioning like the other. A last filter bed in the series to receive the gas stream flow is preferably a static bed. The static bed, like the moving beds, is purged when an appropriate pressure drop is sensed thereacross. The static bed is to serve as a final filter to remove any remaining particulates and is static to avoid any re-entrainment of collect particulate material as may occur with a moving bed and so must be shut down prior to bed changing. Alternatively, the invention, to provide for continuously operating systems, may include a pair of static beds with separate flow paths to each where the gas stream flow can be directed from one bed to the other, allowing for a bed change of filter media materials without requiring system shut down.

As set out above, the preferred system for practicing the method of the invention is a closed system, with granular media materials making up each moving bed to be replenished by new and recycled media material that has passed out of the system through a rotary airlock that maintains the system under a pressure that is less than atmospheric. Which preferred system can operate at any required temperature up to approximately two thousand (2000) degrees F.

DESCRIPTION OF THE DRAWINGS

In the drawings that illustrate that which is presently regarded as a best mode for carrying out the invention:

FIG. 4 is an enlarged side elevation view taken within the line 4—4 of FIG. 2 showing the charged dry sorbent injection gun insulator exposed through a broken away section of the gun housing and showing a charging wand fitted into a barrel thereof in broken lines;

FIG. 5 is an enlarged sectional view taken within the line 5—5 of FIG. 4;

DETAILED DESCRIPTION

Figure 1:
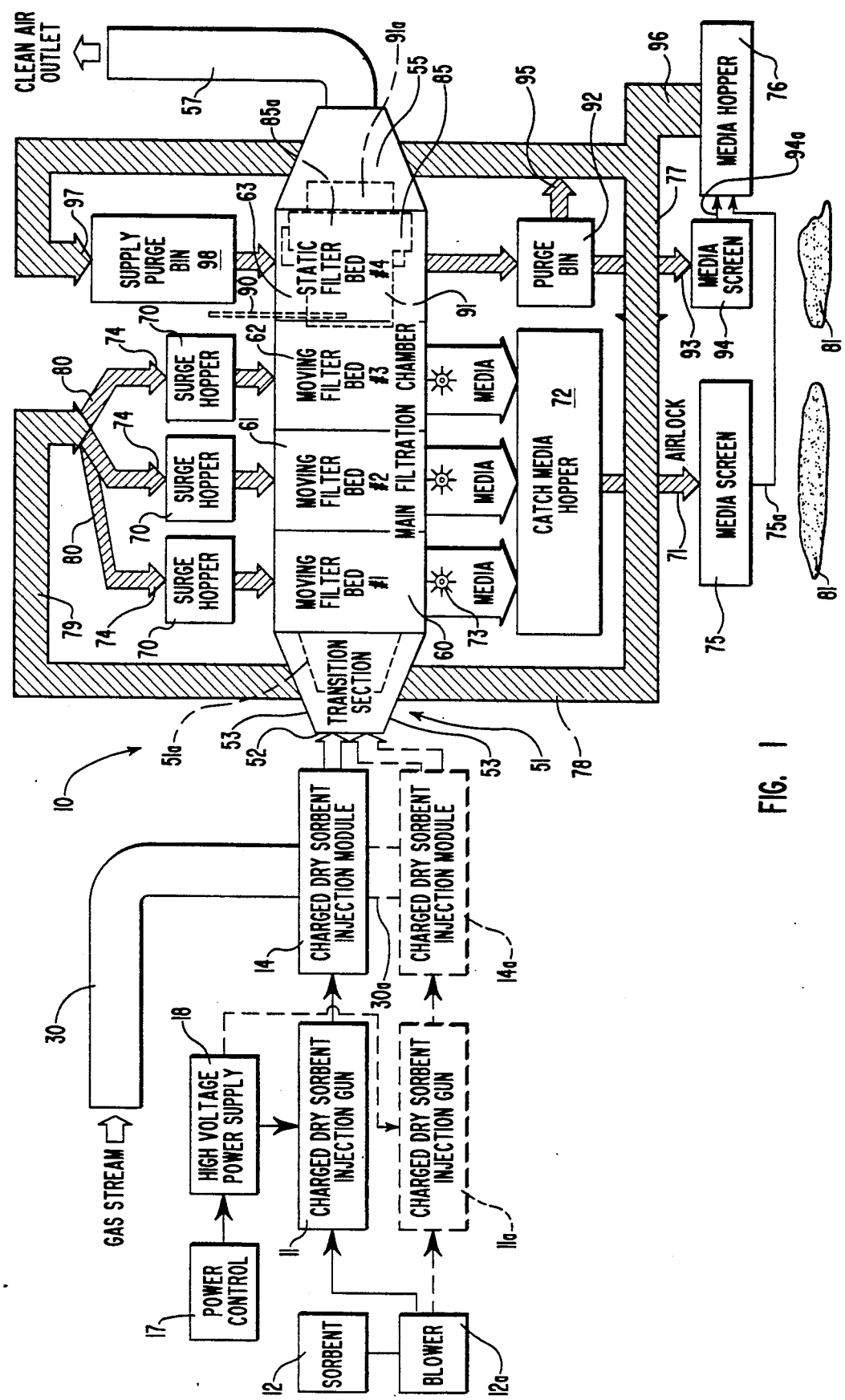
FIG. 1 is block flow schematic view of an apparatus for practicing the method of the invention for removing particulate matter and gaseous pollutants from a polluted gas stream showing a first charged dry sorbent injection gun, power supply and controls and showing, in broken lines, an optional second gun for injecting charged dry sorbent particles into the polluted gas stream, that gas stream directed through multiple moving beds and a static bed of a filter media material that remove agglomerized particles of pollution and sorbent particulates for processing and venting the cleaned air flow to atmosphere.

FIG. 1 shows a block flow schematic view of a preferred apparatus for practicing the method of the invention for removing particulate matter and gaseous pollutants from a polluted gas stream 10, hereinafter referred to as apparatus 10. The apparatus 10 that the method of the invention is preferably practiced on is a system of modules connected together for performing steps of the process for the removal of particulate matter from a gas stream utilizing electrostatic techniques. The method of the present invention improves over prior systems that have exhibited poor efficiencies in the removal of submicron particle size particulates and greater, does so in a completely dry system that does not generate acid mist, can be operated at high temperatures of up to two thousand (2000) degrees F., and provides for operating under less than atmospheric pressure to pull the gas stream therethrough. Additionally, the apparatus 10 provides for varying the charge on and the flow rate of electrostatically charged sorbent particles that are injected into the polluted gas stream for purifying any number and variety of gas streams containing different pollutants. A combination of moving and static beds is provided for removal of essentially all pollutants from the different gas streams, to vent a clean gas to atmosphere and allows for an easy removal of the collected pollutant particulates for use or for transport and for the recycling of both sorbent materials and the media material that make up the moving and static beds, that may be composed of different media material.

Shown in FIGS. 1, 2 and 3, for practicing a first step in the method of the invention, the apparatus 10 includes a sorbent injection gun 11, hereinafter referred to as gun, that receives sorbent particulates from a hopper or bin 12 that have been pressurized at a blower and sorbent feed block 12a and provides for electrostatically charging the particles by passing them through a high voltage corona discharge that surrounds a wand 13, shown best in FIGS. 4 and 5, that is contained within the gun 11. The sorbent material is selected for reacting with the pollutants to be removed from a polluted gas stream. For many applications fine particulate lime is selected, as for example lime particles are suitable for the removal of pollutants from a gas stream emitted by coke ovens, stinter plants or steel-making furnaces. Where, for coal-fired boilers, the selected sorbent material may be nacholite that will react with sulfur dioxide in the gas stream to form sodium sulfate that adheres to the sorbent particles. The media material selected for the sorbent is therefor determined by the pollutants to be removed from that stream. Which sorbent is reduced to fine particles for passage from the sorbent hopper 12 to be electrostatically charged and injected into the gas stream, as set out below.

Figure 2:
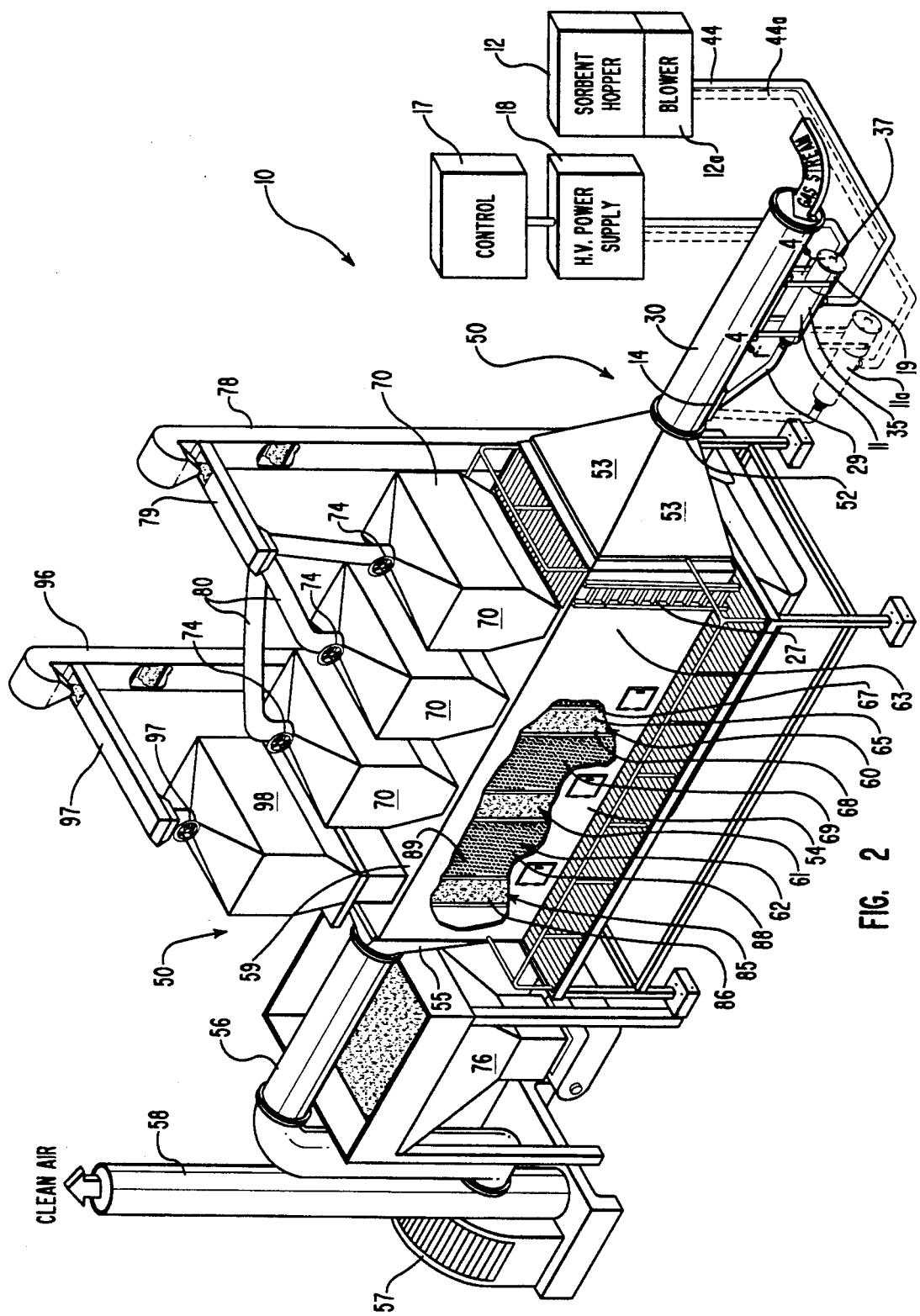
FIG. 2 is a profile perspective view of the apparatus of FIG. 1 showing a sorbent injection gun in solid lines and a second sorbent injection gun in broken lines, and showing a side panel of a filter bed housing that has been broken away to exposed sections of moving and static filter beds serially arranged therein.
Figure 3:
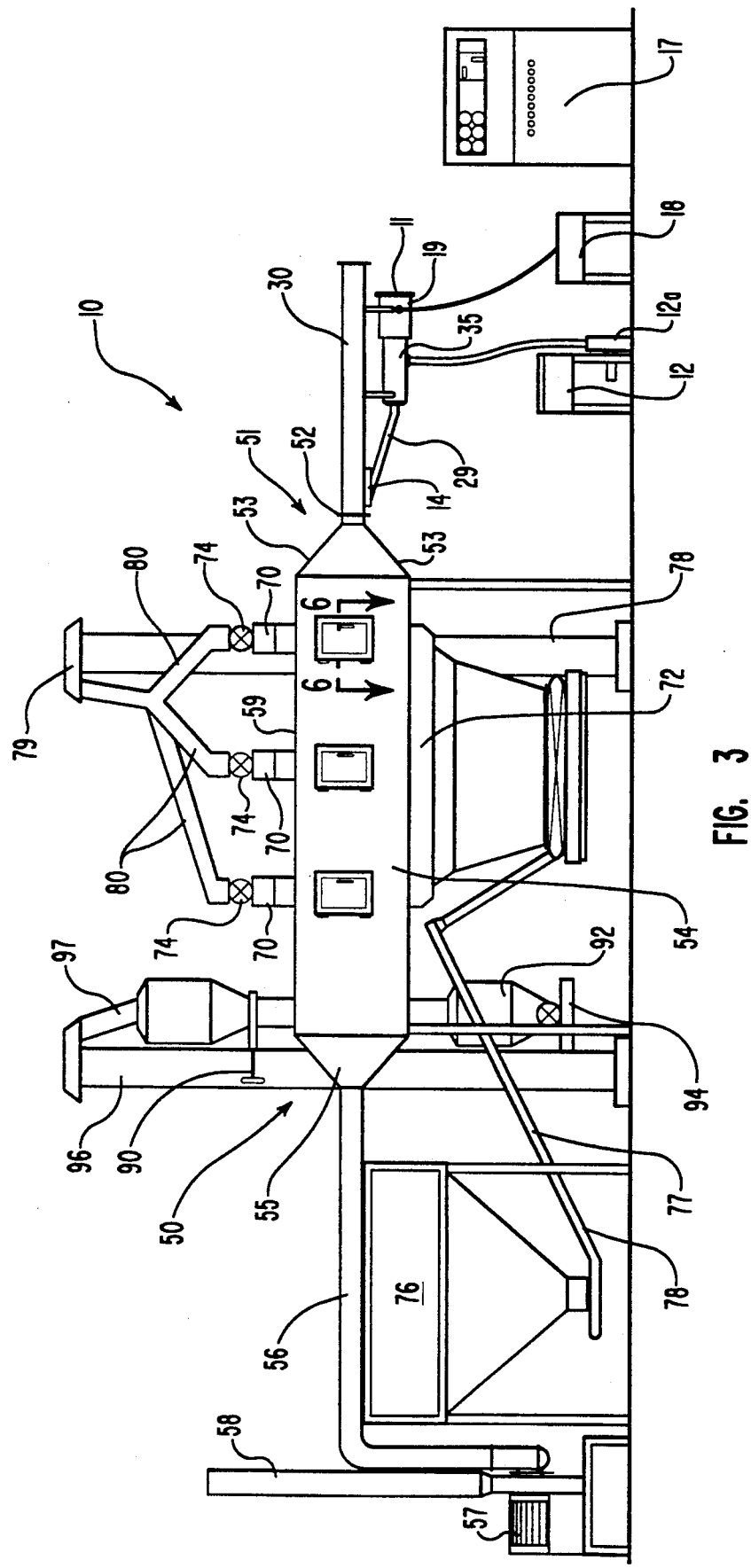
FIG. 3 is a side elevation view of the apparatus of FIG. 2.

Shown in FIGS. 1 through 3, the next step in the process involves injecting the charged fine sorbent particles into a polluted gas stream that flows into a tube 14 that receives the gas stream from a plant discharge. Dependant upon the pollutant character and volume in the stream flow, a single gun 11 may provide a sufficient flow of electrostatically charged sorbent particles into that gas stream to provide a proper electrostatic charging of all the particulates in that flow, include submicron size particulates. Where a single gun 11 is not sufficient, even with a capability for an increase or decrease in the charging field strength as the preferred gun 11 is capable of, a second, third of more sorbent injection gun or guns 11a, as shown in FIG. 2, each receiving a sorbent particle flow, can be arranged to feed sorbent particles into the gas stream. Such second sorbent injection gun 11a, it should be understood, is preferably identical to the gun 11 and so a description of gun 11, its source of sorbent particles under pressure, and its functioning should be taken as a description of the second sorbent injection gun 11a also.

The gun 11 and, as required, the second sorbent injection gun 11a, receive a flow of fine particulate sorbent materials from sorbent hopper 12 that is pressurized, as shown in FIGS. 1 through 3, at a blower and sorbent feed 12a. In practice, the sorbent flow is pressurized to between 1 to 10 psi, as it flows into gun 11 through a sorbent inlet 15, as shown in FIGS. 4 and 5. The gun includes a smooth walled barrel 16 that can be formed of a P.V.C. type plastic, silicon rubber, ceramic, or the like, and wherein the wand 13 longitudinally centered. The charged sorbent particles travel therefrom through a charged dry sorbent injection module 14 and mix into the gas stream that is traveling through tube 30. The wand 13, as set out above, provides a high voltage corona discharge that imparts a like strong electrostatic charge onto each of the sorbent particles. To provide for different volumes of charged sorbent particles as are needed to be entrained in the gas stream for a particular volume of pollutants in that gas stream, the flow rate of the sorbent particulates can be varied. Accordingly, for the invention to accommodate, and properly charge to a strong electrostatic charge, all of the sorbent particles, the voltage that is passed to the wand 13 is preferably arranged to be variable. To provide such a variable voltage to wand 13, as shown in FIGS. 1 through 3, a power control 17 connects to a high voltage power supply 18. The power control 17 is, as shown in FIG. 3, is preferably a control panel where an operator, not shown, can input a required voltage for a certain volume of sorbent so as to provide a required strong electrostatic charge to the individual sorbent particles, charging each negatively or positively. In practice, the power control 17 is capable of varying the voltage supplied to each gun 11 and sorbent injection gun 11a, or guns, to accommodate the flow of sorbent particles therethrough so as to provide the required electrostatic change to which sorbent particles.

Shown in FIGS. 4 and 5, the preferred gun 11 includes a cylindrical insulator housing 19 wherein is contained a high voltage insulator 20, that is shown mounted onto one end to a base 21 to extend longitudinally within the center of insulator housing 19. The opposite end of the high voltage insulator is shown to include a connector 22 that is for electrical connection to the high voltage power supply 18. The connector 22 connects to a conductor that extends longitudinally through the center of the insulator 20, through a ceramic insulator 24, and electrically connects, through a conductive coupling collar 25, to the wand 13 at end 13a. The wand is centered within the smooth walled barrel 16 that is connected, on a rear end adjacent to the sorbent inlet 15, to a collar 31, and on a forward end through a plate 26 to a fitting 27 that is bolted thereto, as shown at 28, containing the smooth walled barrel 16 within a cylindrical housing 35. The fitting 27 connects through a line 29 to the charged dry sorbent injection module 14 that injects the sorbent particles into the gas stream that passes through tube 30. The smooth walled barrel 16 rear end connects through the collar 31 to a cylinder 32 that itself contains the ceramic insulator. The cylinder 32, in turn, mounts, on its rear end, a coupling collar 33 that is fitted through a forward plate 34 of the insulator housing 19 and is bolted to a voltage insulator base 21 and to a flange end 35a of the cylindrical housing 35. The components of the preferred gun 11 are thereby contained within the respective cylindrical housing 35 and insulator housing 19. The insulator housing 19, is shown capped across its rear end by an access plate 36 that includes a handle 37 extending outwardly therefrom. The respective components, as shown, are bolted together into the gun 11.

Figure 5A:
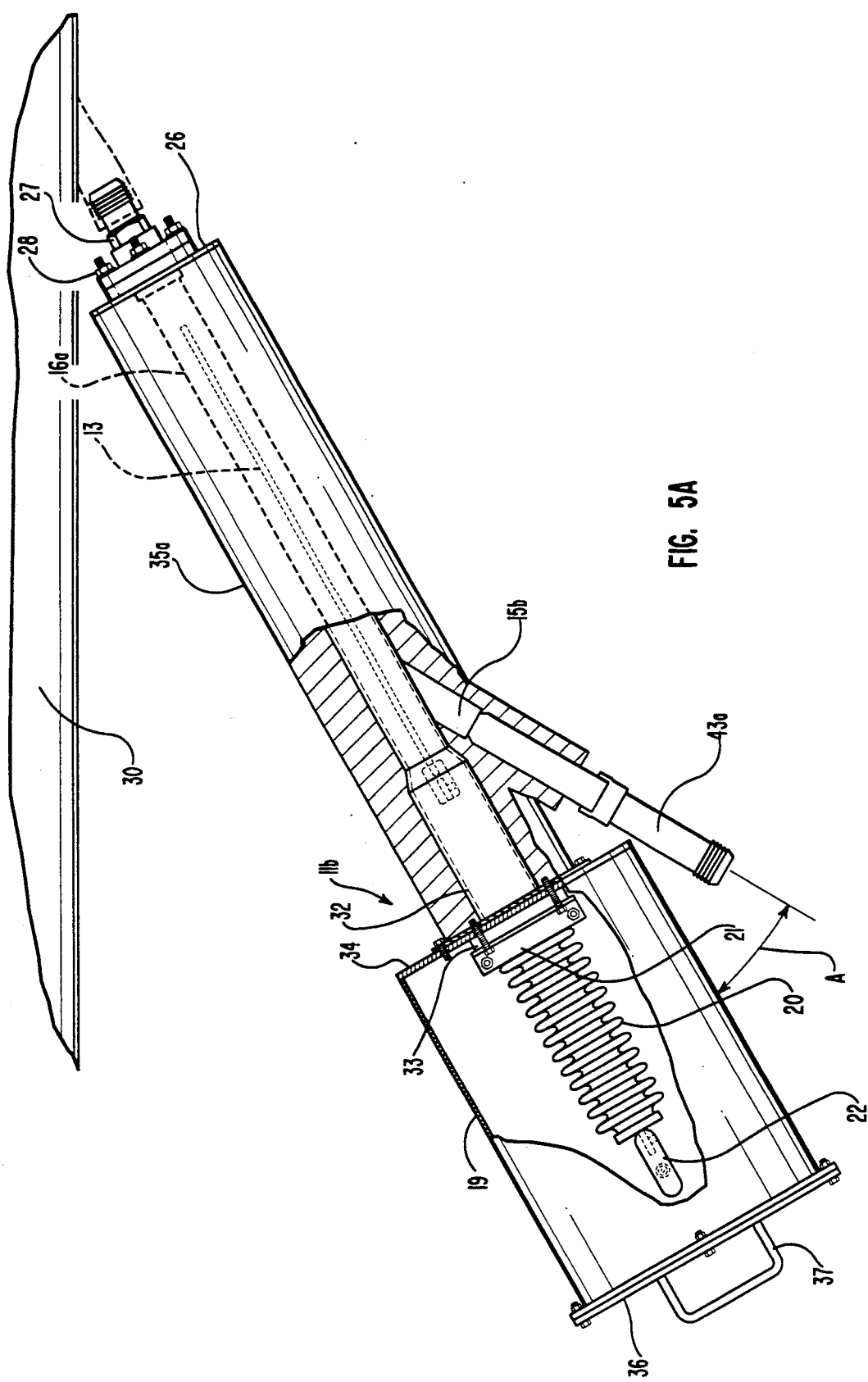
FIG. 5A is a view like FIG. 4 shown another embodiment of a charged dry sorbent injection gun that is formed from a ceramic material.

Shown best in FIG. 5, for a P.V.C. type plastic barrel 16, or the like, the sorbent inlet 15 is preferably bent through a right angle with respect to the barrel 16. Which angle inlet angle, for a ceramic barrel 16a and sorbent inlet 15b combination of a ceramic gun 11b, may be approximately thirty (30) degrees from horizontal, as shown in FIG. 5A. Which ceramic gun 11b is otherwise like the gun 11 and accordingly the components thereof are shown numbered the same as for gun 11. The sorbent inlet 15 of FIGS. 4 and 5, in turn, mounts a coupling collar 15a across its end opposite to its junction with barrel 16. A tube 38 that mounts to an end plate 39 is shown telescoped into which coupling collar 15a, the end plate 39 for closing over the end of a right angle port 40 that is formed into the side of the cylindrical housing 35. The end plate 39 is shown to also include a mounting disk 41 secured thereto, on the opposite end plate face to the tube 38, that is for receiving a like disk 42 fitted and bolted thereto. The disk 42, in turn, mounts a fitting 43 that connects to a sorbent feed line 44, for passing sorbent particles from the sorbent hopper 12 that are pressurized in the blower and sorbent feed 12a. In practice, the sorbent particles are transferred at a pressure of approximately 1 to 5 psi through sorbent feed line 44 that has an approximate diameter of 2 to 3 inches, the flow traveling into the barrel 16 that contains the wand 13 and has a diameter of approximately 2 to 3 inches. The preferred gun 11 for practicing the invention provides a capability for varying the sorbent particle flow to a specific pollutant content of gas stream, and for varying the electrostatic charge imparted onto the sorbent particles by operation of the control panel 17 to appropriately vary the voltage present at wand 13 to provide a desired strong electrostatic charge to each sorbent particle that is appropriate to the actual sorbent flow.

In practice, for a sorbent particle flow from 1 to several hundred pounds per hour, a voltage of 5,000 to several 100,000 volts is passed to wand 13, which voltage is dependent on the distance of the gun outlet and the first bed and the relationship of size of particle in the gas stream that must be removed. The wand 13 thereby maintains a uniform high voltage corona discharge therearound along its entire length to negatively or positively charge each sorbent particle passed through barrel 16.

The sorbent particles that pass by wand 13 absorb a strong electrostatic negative or positive charge and are then injected through the charged dry sorbent injection module 14 into the polluted gas stream. Therein, the sorbent particles that all bear the same negative or positive charge tend to repel one another and are thereby rapidly dispersed throughout that polluted gas stream. A utilization, as is preferred in a practice of the method of the invention, of very fine-grained sorbent particles tends to significantly increase the sorbent's activity, considerably reducing the residence time required for their complete dispersion into the polluted gas stream. The charged particles themselves attract both submicron and larger particulates in the gas stream, gathering them onto the sorbent particles surface, thereby agglomerating them to form larger particles. Additionally, the charged sorbent particles are also selected for chemically reacting with pollutants in the stream and provide a large charged area for charging particulates that are not already agglomerated. The gas stream and entrained sorbent is then directed into a collection system 50 of the invention.

The collection system 50 wherein the steps of the invention for the removal of pollution and sorbent particulates from the gas stream are practiced is shown in FIGS. 1 through 3, is shown as preferably including two distinct collection areas. A first collection area is a transition section 51 that receives the gas stream through a nozzle end 52, that is the same diameter as the tube 30 wherethrough the gas stream and entrained pollution and sorbent particles travels. Walls 53 of the transition cone slope outwardly to present a large square or rectangular area that is opposite to the nozzle end. The transition section 51 is open therethrough and preferably contains, centered therein, a diffuser cone 51a that spreads the gas stream flow outwardly to cover the area of a first filter bed 60, as set out below. The gas stream passing through the transition section 51 and around the diffuser cone 51a experiences a radical change in velocity from the nozzle end 52 to a large formed square or rectangular area of the first filter bed 60. With that change in velocity, heavier particle entrained in the gas flow tend to fall out of the flow in front of the first filter bed 60, as set out hereinbelow, that is positioned across to fill the area opposite to the transition section 51 large square or rectangular area. Which particles, as discussed below, are removed along with particles that have fallen out of the gas stream on contact with the face of the first moving bed filter, along with the filter bed media materials, as set out herein below.

Shown best in FIG. 2, the transition section 51 connects to one end of a collection chamber housing 54 that houses filter beds that are for removing particulate matter from the gas stream in a practice of the method of the invention, the gas stream then passed out an exhaust section 55. The gas stream passing through exhaust section 55 is pulled through a vent tube 56 by a fan 57, with the now clean air vented out through a stack 58.

The collection chamber housing 54 is shown as having a rectangular box arrangement with a number of spaced hoppers mounted along the housing top 59 for passing materials into the filter beds contained in the housing, as set out hereinbelow. The collection chamber housing 54 contains a series of vertical filter beds 60, 61 and 62. Shown in FIG. 2 and the enlarged sectional view of FIG. 6, the first filter bed 60 is opposite to nozzle end 52, between the ends of walls 53 to receive the gas stream from the nozzle end. The first filter bed 60 and second and third filter beds 61 and 62, shown best in FIG. 2, are preferably moving bed filters, and a final or fourth filter bed 63 in the series is preferably a static bed filter. While three moving filter beds are shown herein it should be understood that the invention can include one only moving bed to as many moving filter beds as are required to completely clean the gas stream, and that a description of one of the moving filter beds, specifically the first filter bed 60, and its accompanying feed bins, rotary valved discharge bin, media screen and return lines, should be taken as a description of the other moving filter beds and accompanying components also.

Figure 6:
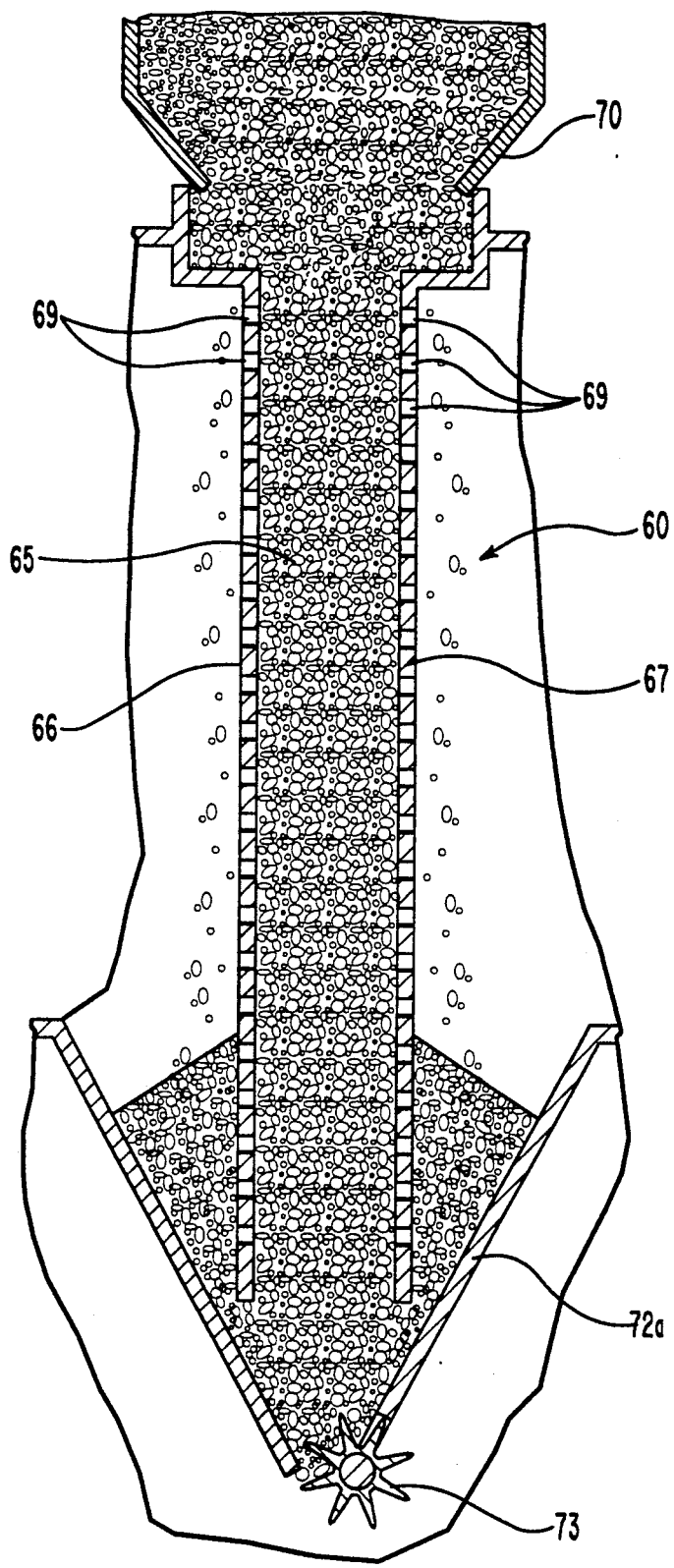
FIG. 6 is an enlarged sectional view of one of the moving beds taken along the line 6—6 of FIG. 3.

The first filter bed 60, as shown in FIGS. 2 and 6, includes a filter 65 formed of a media material maintained between forward and backside plates 67 and 68, respectively. The plates 67 and 68 are each punched with a number of holes 69 therethrough to allow for, essentially, unobstructed passage of the gas stream through the filter 65. The filter 65 is preferably a gravel bed filter that is approximately twelve (12) inches thick and extends across and between top and bottom surface of the collection chamber housing 54. The media material of the filter 65 is selected for removing the particular pollutants contained in a polluted gas stream and may be silica gravel, limestone gravel, an artificial material, and the like, within the scope of this disclosure, functioning as set out below and as illustrated in the included examples. The media material of which filter 65 may be the same for the first, second and third filter beds 60, 61 and 62, respectively, as shown in FIGS. 1 through 3, or may be of different materials as illustrated in the Examples 1 and 2 set out later herein.

Shown in FIGS. 1 and 2, the media making up the moving bed filter 60 is passed into the top of the filter bed 65 from a rotary airlock 74 having passed through a surge hopper 70, shown in FIGS. 1 through 3, and travels through the filter bed responsive to gravity and as controlled by operation of a rotary discharge valve 73, that is shown best in FIG. 6 as a paddle wheel device that extends fully across the filter bed, from wall to wall, below the bed body, and is arranged above a catchment hopper 72. In which travel the filter media material is moving cross current to the direction of gas stream flow and is operated in a plug flow mode. Movement of the filter 65 is controlled by operation of the rotary discharge valve 73, that, as set out above, is preferably a paddle wheel device though, of course, another valve arrangement suitable for the described application could be so utilized. The rotary discharge valve 73, as set out above, preferably extends across the bed, from one side to the other of the collection chamber housing 54. Additionally, another airlock 71 is preferably provided below the rotary discharge valve 73, passing media materials and agglomerized particles onto a media screen 75, the valves operating to provide a closed system. The closed system contained in the collection chamber housing 54 is therefore capable of and is preferably operated at less than atmospheric pressure to provide somewhat of a vacuum effect to pull the gas stream therethrough. In practice, the system is preferably operated at from 1 to 24 inches of water below atmospheric conditions. This operating pressure provides for increased efficiency by pulling the gas stream through the filter 65, providing for an increase in the efficiency of the separation of pollutant gases entrained in the gas stream, that are precipitated onto the surface of the filter media particles. A chemical reaction for which reaction where hydrated lime or ammonia is used as the sorbent material to remove $SO_2$ gas contained in the gas stream is as follows:

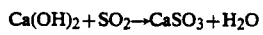

$$Ca(OH)_2 + SO_2 \rightarrow CaSO_3 + H_2O$$

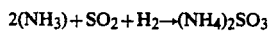

$$2(NH_3) + SO_2 + H_2 \rightarrow (NH_4)_2SO_3$$

The above reactions are facilitated by operation at less than atmospheric pressure by the gas stream being drawn through the filter beds. Further, the closed system facilitates operations at high temperatures of up to two thousand degrees F. Which high temperature operations both significantly improve system efficiency and are an effective bar to a generation of an acid mist as a product of a chemical reaction as could damage the equipment, as for example, where sulfur dioxide is a pollutant being removed from a gas stream, as has been the case with earlier systems. To maintain an operating pressure within the collection chamber housing 54, the rotary discharge valve 73 controls media material falling under the urgings or gravity between the front and rear plates 66 and 67 as the rotary discharge valve 73 is operated responsive to a sensed pressure drop across the first filter bed 60 from feed hopper 70. When such pressure drop is sensed by sensors placed on forward and rear sides of the first filter bed, that indicates that the filter 65 is plugging, the paddle wheel of the rotary discharge 73 is turned. The plugged filter media materials are thereby passed out of the filter bed 60 and flow through the airlock 71 onto a media screen, as illustrated in FIG. 1, whose function will be set out hereinbelow. Media materials from the feed hopper 70 to fill the area of the filter 65 between the forward and backside plates 67 and 68.

Filter 65 movement above rotary discharge valve 73, as shown in FIG. 6, causes some media particles to be ejected through the openings 69 in plates forward and backside plates 67 and 68, respectively, thereby keeping those holes open to provide a free flow path to the gas stream. The ejected media particles fall, as shown, into the catchment skirt 72a. Skirt 72a also receives the heavy particles that fall out of the gas stream on a reduction of the gas stream velocity in the transition section 53, and on contact of the gas stream with the forward plate 67. Which particles are mixed with the filter media materials that contain agglomerized particles to pass through the rotary discharge valve 73.

Shown in FIG. 1, particulate and media materials pass from the catchment hopper 72 through airlock 71 and are deposited onto a media screen 75. The media screen 75 passes the agglomerized particles and shakes off pollutant particles which have adhered to the media particles. The cleaned media material particles are then moved through line 75a for recycling back to the hopper 70 for refeeding back through the moving filter beds 60, 61, and 62. Media material losses at the media screen 75 are made up from a media hopper 76 that passes media particles through line 77. The clean screened and added media material particles are then passed through line 78 upward to dump into a horizontal line 79 that branches into hopper feed lines 80 that dump the clean media materials through airlocks 74 into individual hoppers 70, feeding each moving filter bed 60, 61 and 62.

As set out above the description of the first filter bed 60 should be taken as a description of all the moving filter beds 60, 61 and 62. In practice, the first filter bed 60 will collect between seventy five (75) to ninety five (95) percent of the particulate material entering the collection system 50, which collected material includes the sorbent and sorbent reacted particulates. The remaining moving filter beds 61 and 62 to remove essentially the balance of the particulate material in the gas stream and to react with pollution gases therein. Accordingly, with different sorbent flow rates, as provided for cleaning a certain gas flow, more or less than the three (3) moving filter beds can be incorporated into the collection system 50, within the scope of this disclosure. Also, for some applications it may be required or desirable to utilize a different size of media material particles from that utilized in the first filter bed 60, and it may even be preferably to utilize different media material than that used in the first filter bed, as set out in Examples 1 and 2 below. Such utilization of different size of media material or of different type or types of media materials as the filters for the individual filter beds will, of course, require a utilization of a different media material replenishment arrangement than that shown in FIGS. 1 and 2, to include individual media hoppers 76 for replenishing the bed materials as well as separate flow lines for feeding the individual media material hoppers 70.

In FIG. 1 piles of material 81 are shown as having been screened out by media screen 75 and a static bed media screen 94 and are arranged below each screen, with lines 75a and 94a, respectively, shown for passing cleaned media material to the media hopper 76. The screened material 81 containing the gas stream pollutants can then be processed for separating the various constituents for recycling and reuse and/or disposal, within the scope of this disclosure.

A static filter bed 85, shown in FIGS. 1 and 2, is provided within the collection system 50, arranged across the interior of the collection chamber housing 54, that receives the gas stream passed from the third filter bed 62, and is to finally remove essentially all the sorbent particles agglomerated particles and gaseous pollutants from the gas stream. Where, as set out below, the media material in the filter 86 of static filter bed 85 can be changed, it is normally not changed during an operation cycle as the materials it picks up during a cycle are generally insufficient to create plugging. The static bed is, however, periodically purged during system shutdown or when an appropriate pressure drop across the static filter bed 85 is sensed. The static bed 85 is, or course, the same size as the moving filter beds 60, 61 and 62, and may be the same, greater, or lesser thickness, within the scope of this disclosure, with the filter of media material 86 contained between forward plate 88 and a backside plate that are preferably punch plates that include a large number of holes 89 formed therethrough. The static filter bed 85 serves as a polishing filter that follows up the moving filter beds. It is static because any movement of the bed, no matter how slow, will cause a re-entrainment of the collected particulate materials. Accordingly, purging of the static filter bed is usually undertaken prior to system start-up or after shutdown. Additionally, where a system is to operate continuously two static beds dove-tailed together can be utilized, as illustrated by a broken line representation in the block flow schematic of FIG. 1. Shown therein in broken lines, the air stream is directed around the static filter bed 85 by fitting a baffle plate 90 into the collection chamber housing 50 to redirect air stream flow into a conduit 91 that directs the flow through an alternative static filter bed 85a such that the air stream passes through exhaust conduit 91a into the exhaust section 55. With the air stream redirected around the static filter bed 85, the filter 86 can be emptied and refilled with clean media material and the flow therethrough restored.

For static filter bed 85 purging, media inlet and outlet rotary airlock valves 97 and 93, respectively, shown as arrows in FIG. 1, are provided for passing static filter bed 85 media material therein and discharging same after system shutdown. Which valves are closed during system operation to prevent infiltration of outside air into the unit. Filter media material 86 is vented to a purge bin 92 that directs the flow through a valve 93, shown as an arrow, to a media screen 94. The media screen, like media screen 75, provides for the removal of agglomerized particles and provides for shaking off particulate matter from the media material. The clean media material is transferred through line 94a to the media hopper 76, with the pile 81 of material deposited below the media screen 94 for processing for recycling, reuse and/or disposal, as described above. The clean media material is passed from the media hopper 76 into a media material supply line 96 from media hopper 76. Additionally, where the media material in the purge bin 92 is clean, it can be passed directly from the purge bin 92 through line 96 into media supply line. The recycled media material and unused media material are thereby transported by mechanical means through line 96 to an inlet rotary airlock valve 97, shown as an arrow, for passage into supply purge bin 98 that supplies clean media material to the static filter bed 85, as described above. In operation, the static filter bed 85 is to remove agglomerized particles and gases collected from the gas stream and functions essentially as set out above for the moving filter beds 60, 61 and 62, and so will not be further discussed.

Operation of the component systems of the apparatus 10 for performing the steps of the method of the invention, as set out above, it should be understood, is provided by electrically operated devices, such as blowers and motors. Which devices, it should be understood, are relatively low horsepower motors and/or require relatively low horsepower to operate, thereby proving a simple and robust system that is inexpensive to use and maintain.

Examples of the steps involved in the operation of the apparatus 10 of the invention for removing essentially all pollutants in a gas stream are set out and discussed hereinbelow as Examples 1 and 2:

EXAMPLE 1

This is a hypothetical example of a practice of the method of the invention for removing particulate matter and gaseous pollutants simultaneously from a gas stream generated by a Copper Smelter utilizing the preferred apparatus. Reference is hereby made to the apparatus of FIG. 1 for practicing the steps of the method:

For this example, a polluted gas stream 30 having a flow rate of 35,000 ACFM at a temperature of 350 degrees F., is cleaned by a practice of the present method. The gas stream has a particulate grain loading of 5.0 gr./DSCF and a gaseous pollutant of $SO_3$ with a grain loading of 1.0 gr./DSCF, as the primary pollutants is to be cleaned therefrom. Other pollutants are associated with the gas stream, but are of minor importance in the overall clean up of the gas stream. A modeling program is specifically designed and sized for a preferred apparatus for calculating the material flow and volume of sorbents to be used for cleaning of a particular pollution content of a gas stream, the selected sorbent material is Hydrated Lime $Ca(OH)_2$. The rate of feed for the electrostatically charged hydrated lime for the example is 155 pounds per hour utilizing a single charged dry sorbent injection gun 11.

A first step in the method involves electrostatically charging a flow of sorbent particles that are injected into the gas stream. For this example, one hundred fifty five pounds per hour of hydrated lime, fine grained $-200$ mesh, is feed from the sorbent storage hopper 12 to the charged dry sorbent injection gun 11 where a electrostatic charge of 80,000 volts is applied to the fine grained hydrated lime particles from the high voltage power supply 18. The voltage charge on the hydrated lime is determined from the results of a screen analysis on the particulate matter pollutants that must be removed, the distance the charging gun is located from the moving media first filter bed and the amount and type of sorbent used. The charge will be a variable charge, depending on site specific information that is part of the modeling program. In a next step, the hydrated lime after being electrostatically charged is feed into the charged dry sorbent injection module 14, which feeds the electrostatically charged hydrated lime into the polluted gas stream 30. The charged sorbent rapidly disperses into the gas stream, providing a large charged surface area for inducing the electrostatic charge onto the particulate matter entrained within the incoming gas stream and to supply a large area for the chemical reaction between the sorbent and the gaseous pollutants to react in. The gas stream with entrained charged sorbent particles is then passed into a transition section 53, directed against a dispersal cone 51a to disperse the gas stream throughout the transition section. From the injection module 14 to the transition section 53, a chemical reaction between the hydrated lime and the $SO_3$ takes place, creating $CaSO_4$, or gypsum, and the charged hydrated lime sorbent agglomerates the particulate material, more specifically the PM-10 particles. This area is more specifically called the residence area or zone, and may or may not contain a specially constructed residence chamber.

The transition section 53 has a much greater area than the gas stream line, causing a rapid decrease in the gas flow velocity. This change in velocity causes some of the heavier particulate particles and sorbent reacted gaseous pollutants in the gas stream to precipitate out of that flow, falling in front of a first of a plurality of vertical media material moving bed filters that receive the dispersed gas stream and wherein pollutants are first removed from the stream. The vertical moving bed filters, in this case are charged with two types of media material, sized to $-\frac{3}{8}$ inch to $+5$ mesh. The first moving media bed filter is charged with limestone, a product used by a copper smelter in the smelting process, is used were to further enhance the reaction of $SO_3$ and to insure maximum clean up of the gaseous pollutants from the gas stream, which clean up in the first moving filter bed is approximately seventy five (75) percent, or greater of the pollutants present in the stream. Passage of the gas stream, in turn, through the remaining second and third moving bed filters and the static filter remove the remainder of the pollutants from the gas stream, the media material for which moving and static bed filters are slag, a by-product of copper smelting process, whose provides an optional method step in that its use saves upon the screening costs of the material providing a cost savings, and adds to the recovery of volatilized copper, gold and silver, that is collected in this process, but is typically lost or not collected in conventional pollution control systems or devices. Any pollutants that have no economic value will thereby be consumed in the smelting process or entrained in the slag from the smelting process and later disposed of when the slag is drawn off and transported to the smelters slag disposal area, thus reducing handling problems associated with the disposal of collected fines and sorbent reacted material as in other processes.

The second and third moving media bed filters and the static media bed filter material will be set up to recycle the slag, screening any collected particulates and sorbent reacted gaseous pollutants from the slag media, providing for reusing the screened media material slag that is sent back into the second and third moving media bed filters and the static media bed filter, respectively. The particulates and pollutants screened from the media material will be sent directly into the smelting process to further recover any volatilized copper, gold and silver and to dispose of any particulates and collected pollutants of non economic value into the clients slag from the smelting process, as previously mentioned.

EXAMPLE 2

This is a hypothetical example of a practice of the method of the invention for removing particulate matter and gaseous pollutants simultaneously from a gas stream generated by a Copper Smelter. Reference is hereby made to the apparatus of FIG. 1 for practicing the steps of the method:

For this example, a polluted gas stream 30 having a flow rate of 50,000 ACFM that is at a temperature of 800 degrees F. is cleaned by a practice of the present method. The gas stream has a particulate grain loading of 15.0 gr./DSCF and a gaseous pollutant of $SO_2$ with a grain loading of 2.0 gr./DSCF, (374 pounds/hour), as the primary pollutants to be cleaned therefrom. Other pollutants are associated with the gas stream, but are a minor importance in the overall clean up of the gas stream. A modeling program is specifically designed and sized for a preferred apparatus for calculating the material flow and volume of sorbents to be used for cleaning of a particular pollution content of a gas stream, the selected sorbent material is a Hydrated Lime $Ca(OH)_2$ and ammonia $NH_3$. The rate of feed of electrostatically charged hydrated lime and ammonia for the example is 534 and 54 pounds per hour, respectfully, utilizing a two charged dry sorbent injection guns 11 and 11a.

A first step in the method involves electrostatically charging a flow of sorbent particles that are injected into the gas stream. For this example, three hundred fifty pounds per hour of hydrated lime, fined grained, −200 mesh, is feed from the sorbent storage hopper 12 to the charged dry sorbent injection gun 11 where a electrostatic charge of 102,000 volts is applied to the fine grained hydrated lime particles from the high voltage power supply 18. 184 pounds per hour of hydrated lime, fine grained, −200 mesh, is feed from the sorbent storage hopper 12a together with 54 pounds per hour of ammonia gas to the charged dry sorbent injection gun 11a where a electrostatic charge of 98,000 volts is applied to the fine grained hydrated lime particles and ammonia gas from the high voltage power supply 18a. The voltage charge on the hydrated lime and the ammonia, is determined from the results of a screen analysis on the particulate matter pollutants that must be removed, the distance the charging gun is located from the first moving media filter bed and the amount and type of sorbents used. The voltage charge is variable and is determined from site specific information that is part of the modeling program. The hydrated lime and ammonia after being electrostatically charged are fed into the charged dry sorbent injection module 14 and 14a, which feeds the electrostatically charged hydrated lime and ammonia into the polluted gas stream 30. The charged sorbents rapidly disperse into the gas stream, providing a large charged surface area for inducing the electrostatic charge onto the particulate matter entrained within the incoming gas stream and to supply a large area for the chemical reaction between the sorbents and the gaseous pollutants to react in. The gas stream with entrained charged sorbent particles is then passed into a transition section 53, directed against a dispersal cone 51a to disperse the gas stream throughout the transition section. From the injection module 14 and 14a to the transition section 53, a chemical reaction between the hydrated lime and ammonia and the $SO_2$ takes place, creating $CaSO_3$, calcium sulfite + $H_2O$ and $(NH_4)_2SO_3$, ammonium sulfite and the charged hydrated lime sorbent also agglomerates the particulate material, more specifically the PM-10 particles. This area is more specifically called the residence area or zone, and may or may not contain a specially constructed residence chamber.

The transition section 53 has a much greater area than the gas stream line, causing a rapid decrease in the gas flow velocity. This change in velocity causes some of the heavier particulate particles and sorbent reacted gaseous pollutants in the gas stream to precipitate out of that flow falling in front of a first of a plurality of vertical moving media bed filters. The vertical moving media bed filters, in this case are charged with two types of media material, sized to −⅜ inch to +6 mesh. The first moving media bed filter is charged with silica gravel, a product used in the smelting process. The remaining second and third moving media bed filters and the static filter are charged with slag, a byproduct of copper smelting, which will be of a minimum cost. The media material from the first moving media bed will be feed directly into the smelting process, since silica is a flux material used in the smelting of copper concentrates, for this particular application. This direct feeding from the first moving media bed filter into the smelting process will save on the screening costs of the material, presenting a cost savings, and will help in the recovery of volatilized copper, gold and other base metals, that are collected in this process, but are typically lost or not collected in conventional pollution control systems or devices. Any pollutants that have no economic value will be consumed in the smelting process or entrained in the slag from the smelting process and disposed of when the slag is drawn off and transported to the smelters slag disposal area, thus reducing handling problems associated with the disposal of collected fines and sorbent reacted material as in other processes.

The second and third moving media bed filters and the static media bed filter material will be set up to recycle the slag, screening any collected particulate and sorbent reacted gaseous pollutants from the slag media, providing for reusing the screened media material that is sent back into the second and third moving media bed filters and the static media bed filter, respectively. The particulates and pollutants screened from the media material will be sent directly into the smelting process to further recover any volatilized copper, gold, silver and other base metals and to dispose of any particulates and collected pollutants of non economic value into the clients slag from the smelting process, as previously mentioned.

While a preferred apparatus for practicing the steps of our invention in a method for removing particulate matter and gases from a polluted gas stream has been shown and described herein, it should be understood that the present disclosure is made by way of example only and that variations and changes thereto are possible without departing from the subject matter coming within the scope of the following claims, and a reasonable equivalency thereof, which claims we regard as our invention.

We claim:

1. A method for removing particulate matter and gaseous pollutants from a polluted gas stream comprising the steps of, injecting a flow of electrostatically charged sorbent particles into a polluted gas stream, which said sorbent is selected for the particular pollutants in said gas stream with the volume of said sorbent particles selected for the quantity of pollutants in said gas stream and the charging voltage applied to said sorbent particles is variable to provide a maximum charge on each sorbent particle; passing the gas stream containing said charged sorbent particles into a transition section of a collection chamber housing, which said transition section widens from its inlet to its exhaust end, providing for a reduction in gas stream velocity passing therethrough causing heavy particulates to fall out of said gas stream; distributing said gas stream over and passing said gas stream through a first moving bed filter containing a media material that is maintained vertically in said collection chamber housing across said transition section exhaust end wherein agglomerized pollution and sorbent particulates are removed during passage through said media material, which said media material in said first moving bed upon sensing of a set pressure drop across said filter is changed for clean media material by operation of a rotary discharge valve that passes said media material out of a bottom end of said first moving filter bed, with clean media material passing from a media material hopper above said first moving filter bed through a top of said first moving filter bed, replenishing said media material as has passed through said rotary discharge valve; passing said gas stream through at least one additional moving filter bed containing a media material that is arranged vertically in said collection chamber housing, is opposite and parallel to said first moving filter bed and is essentially the same as and functions like said first moving filter bed, may include the same or different media material as used in said first moving filter bed and is for removing additional agglomerized pollution and sorbent particulates from said gas stream; passing said gas stream through a static filter bed that contains the same or different filter media material as used in the first and additional moving filter beds and is vertically maintained in said collection chamber housing parallel to and immediately opposite to a last of said additional moving filter beds, and said static filter bed media material is not changed during system operation and is to finally remove essentially all remaining pollution and sorbent particulates from said gas stream; and venting said gas stream as has passed from said static filter bed to atmosphere.

2. A method as recited in claim 1, wherein the gas stream within the transition section is dispersed therein by passage around a diffusion cone that is maintained in the center of and opposite to the inlet of said transition section, an apex of said diffusion cone to face said inlet wherethrough said gas stream enters said transition section.

3. A method as recited in claim 1, wherein the collection chamber housing has a rectangular shape, the vertical filter beds fitted from top to bottom and side to side therein, with each said filter bed for containing the media material have spaced apart parallel forward and backside plates that each have a plurality of holes punched therethrough providing passage of the gas stream therethrough, and said punched holes are each of a diameter to allow particles of media material to leak therethrough for cleaning said punched holes so as to prevent their clogging.

4. A method as recited in claim 1, further including maintaining the pressure in the collection chamber housing at a pressure that is less than atmospheric.

5. A method as recited in claim 1, wherein the media material in each moving bed filter is changed by operation of the outlet rotary discharge valve that provides for turning a paddle wheel thereof that extends across the filter bed, with said media material containing agglomerized pollution and sorbent particles gravity fed therethrough and falls into a catchment hopper.

6. A method as recited in claim 5, further including passing the collected media material containing agglomerized pollution and sorbent particles onto a media screen that removes the agglomerized pollution and sorbent particles from said media material, cleaning said media material; and transporting said clean media material back to the media material hopper for recycling through the moving bed filters.

7. A method as recited in claim 6, further including adding new media material, as needed, to the cleaned media material for reuse in each moving filter bed.

8. A method as recited in claim 1, further including providing a second static bed filter and ducting for temporarily routing the gas stream around the static filter bed and into said second static filter bed to allow for the changing of said static filter bed media material without shutting off said gas stream upon a sensing of a pressure drop across said static filter bed media that is sufficient to warrant changing said media material in said static filter bed; and restoring said gas stream flow into said static filter bed after said media material therein has been changed to clean media materials.

9. A method as recited in claim 8, wherein the media material as has been discharged from said static filter bed is passed onto a media screen means for screening out agglomerized particles pollution and sorbent particles and collected reaction products for processing or disposal; and recycling said media material with newly added clean media material, as needed, for reuse in said static and second static filter beds.

10. A method as recited in claim 1, wherein the media material is a silica, limestone gravel, slag, sinter ceramic or other appropriate natural or manmade material.

11. A method as recited in claim 1, wherein the media material used in the filter beds is selected for the removal of the pollutants in a particular gas stream.

12. A method as recited in claim 1, wherein the electrostatically charged sorbent particles injected into the polluted gas stream are provided by a sorbent injection module that includes a source of sorbent particulates that includes a housing containing an electrostatic charging wand that is connected to a variable source of electrical power to produce a high voltage corona discharge surrounding said wand that is appropriate for fully charging all the sorbent particles injected into said polluted gas stream; and passing a flow of sorbent particles, under pressure, through said housing that pass through said corona discharge surrounding said wand and are thereby fully electrostatically charged and into line connecting said housing into the pipe carrying the polluted gas stream.

13. A method as recited in claim 12, wherein the housing is a cylinder that contains a tube fitted longitudinally therein that mounts the wand longitudinally in the center thereof, said tube connecting into the line for passing a selected volume of charged sorbent particles into the polluted gas stream from the source of sorbent particulates that will fully react with all the pollution particulates present in the gas stream, said sorbent particles traveling into said cylinder to flow around said wand.

14. A method as recited in claim 13, wherein a plurality of sorbent injection modules are provided for connection into the pipe carrying the polluted gas stream, each providing a volume of flow of electrostatically charged sorbent particles into said polluted gas stream to react with all the pollution particulates present in said particular gas stream.

* * * * *